United States Patent
Bruno et al.

(10) Patent No.: US 6,725,456 B1
(45) Date of Patent: Apr. 20, 2004

(54) METHODS AND APPARATUS FOR ENSURING QUALITY OF SERVICE IN AN OPERATING SYSTEM

(75) Inventors: John Louis Bruno, Davis, CA (US); José Carlos Brustoloni, Chatham, NJ (US); Eran Gabber, Summit, NJ (US); Banu Ozden, Summit, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,035

(22) Filed: Nov. 29, 1999

(51) Int. Cl.$^7$ .................................................. G06F 9/00
(52) U.S. Cl. ...................... 718/102; 718/100; 718/104; 719/328; 709/222; 709/226
(58) Field of Search ................................. 709/104, 107, 709/200, 100, 102, 222, 226, 328; 370/236, 420

(56) References Cited

U.S. PATENT DOCUMENTS

| | | | | |
|---|---|---|---|---|
| 5,097,533 A | * | 3/1992 | Burger et al. | 709/328 |
| 5,349,682 A | * | 9/1994 | Rosenberry | 709/102 |
| 5,461,611 A | * | 10/1995 | Drake et al. | 370/420 |
| 5,519,867 A | * | 5/1996 | Moeller et al. | 709/107 |
| 5,819,043 A | * | 10/1998 | Baugher et al. | 709/222 |
| 5,826,082 A | * | 10/1998 | Bishop et al. | 709/104 |
| 5,835,724 A | * | 11/1998 | Smith | 709/227 |
| 5,860,020 A | * | 1/1999 | Van Venrooy et al. | 712/28 |
| 5,978,582 A | * | 11/1999 | McDonald et al. | 717/104 |
| 6,148,324 A | * | 11/2000 | Ransom et al. | 709/105 |
| 6,275,983 B1 | * | 8/2001 | Orton et al. | 717/116 |
| 6,378,126 B2 | * | 4/2002 | Tang | 717/143 |
| 6,381,579 B1 | * | 4/2002 | Gervais et al. | 705/8 |
| 6,449,255 B1 | * | 9/2002 | Waclawsky | 370/236 |
| 6,505,229 B1 | * | 1/2003 | Turner et al. | 709/107 |
| 6,529,948 B1 | * | 3/2003 | Bowman-Amuah | 709/217 |
| 6,618,743 B1 | * | 9/2003 | Bennett | 709/104 |

OTHER PUBLICATIONS

Ranganathan, Kumar. "Dynamic Feedback costing to enable adaptive control of resource utilization". U.S. patent application Publication 2002/0147759 A1.*

Wilson et al. "System for allocating resources in a computer system." U.S. patent application Publication 2003/0041088 A1.*

(List continued on next page.)

Primary Examiner—Thomas Lee
Assistant Examiner—Lilian Vo

(57) ABSTRACT

A uniform application programming interface (API) provides efficient generation and control of resource reservations so as to ensure a desired quality of service (QoS) for applications running on an operating system of a computer system. The uniform API is based on a hierarchical file system which associates resource reservations with references to shared objects, rather than with the objects themselves. The uniform API permits the use of a variety of different proportional share schedulers for controlling access to physical resources, e.g., CPU, memory, disk, network interfaces, etc. of the computer system. The hierarchical file system includes a separate directory for each independently-scheduled physical resource of the computer system. A parent of the resource reservation in the hierarchical file system is either a root node of the file system or another reservation for the same resource. The resource reservation represents either an internal reservation, corresponding to a directory in the file system which is permitted to have child nodes associated therewith in the file system, or a queue, corresponding to a directory which is not permitted to have child nodes associated therewith. A given request for a resource reservation is processed by a proportional share scheduler associated with the resource, and identifies a queue having a predetermined portion of the resource allocated thereto. The invention also provides mechanisms for request tagging by the operating system, parental limitation of resources used by a child process, and "garbage collection" of resource reservations that are no longer needed.

23 Claims, 9 Drawing Sheets

OTHER PUBLICATIONS

Saleh et al. "Method for routing information over a network." U.S. patent application Publication 2002/0054572 A1.*

Engel et al. "Efficient Classification manipulation and control of netowrk transmission by associating network flows with rule based functions." U.S. patent application Publication 2003/0005144 A1.*

Jackson et al. "System and methods for resource utilization analysis in information management environments". U.S. patent application Publication 2002/0152305 A1.*

Trans et al. "Channel equalization system and method". U.S. patent application Publication 2003/0016770 A1.*

Jorgensen, Jocob. "Transmission control protocol/internet protocol (TCP/IP) packet–centric wireless point to multi-point (PTMP) transmission system architecture". U.S. patent application Publication 2002/0099854 A1.*

Gupta et al. "Automatic design of VLIW processors". U.S. patent application Publication 2002/0133784 A1.*

Elliott et al. "System and method for providing requested quality of service in a hybrid network." U.S. patent application Publication 2002/0064149 A1.*

I. Stoica et al., "A Proportional Share Resource Allocation Algorithm for Real–Time, Time–Shared Systems," in Proceedings of Real Time Systems Symp., IEEE, pp. 1–12, Dec. 1996.

D. Stiliadis et al., "Frame–Based Fair Queuing: A New Traffic Scheduling Algorithm for Packet–Switched Networks," Tech. Rep. UCSC–CRL–95–39, Univ. Calif. Santa Cruz, pp. 1–14, Jul. 1995.

J. Mogul et al., "Eliminating Receive Livelock in an Interrupt–driven Kernel," in Proceedings of Annual Tech. Conf., USENIX, pp. i–viii and 1–46, 1996.

J. Bruno et al., "The Eclipse Operating System: Providing Quality of Service via Reservation Domains," in Proceedings of Annual Tech. Conf., USENIX, pp. 235–246, Jun. 1998.

J. Bennet et al., "WF$^2$Q: Worst–Case Fair Weighted Fair Queueing," in Proceedings of INFOCOM'96, IEEE, pp. 120–128, Mar. 1996.

J. Bennet et al., "Hierarchical Packet Fair Queueing Algorithms," in Proceedings of SIGCOMM'96, ACM, 7 pages, Aug. 1996.

P. Goyal et al., "A Hierarchical CPU Scheduler for Multimedia Operating Systems," in Proceedings of OSDI'96, USENIX, pp. 107–121, Oct. 1996.

J. Bruno, et al., "Disk Scheduling with Quality of Service Guarantees," in Proceedings of ICMCS'99, IEEE, 3 pages, Jun. 1999.

P. Druschel et al., "Lazy Receiver Processing (LRP): A Network Subsystem Architecture for Server Systems," in Proceedings of OSDI'96, USENIX, pp. 261–275, Oct. 1996.

D. Ghormley et al., "SLIC: An Extensibility System for Commodity Operating Systems," in Proceedings of Annual Tech. Conf., USENIX, 15 pages, Jun. 1998.

P. Goyal et al., "Start–Time Fair Queuing: A Scheduling Algorithm for Integrated Services Packet Switching Networks," in Proceedings of SIGCOMM'96, ACM, pp. 1–14, Aug. 1996.

M. Jones et al., "CPU Reservations and Time Constraints: Efficient, Predictable Scheduling of Independent Activities," in Proceedings of SOSP'97, ACM, pp. 198–211, Oct. 1997.

J. Nieh, "The Design, Implementation and Evaluation of SMART: A Scheduler for Multimedia Applications," in Proceedings of SOSP'97, ACM, pp. 184–197, Oct. 1997.

P. J. Shenoy et al., "Cello: A Disk Scheduling Framework for Next Generation Operating Systems," in Proceedings of SIGMETRICS'98, ACM, 6 pages, Jun. 1998.

G. Banga et al., "Resource Containers: A New Facility for Resource Management in Server Systems," in Proceedings of OSDI'99, USENIX, pp. 45–58, Feb. 1999.

B.D. Noble et al., "Agile Application–Aware Adaptation for Mobility," in Proceedings of SOSP'97, ACM, 6 pages, 1997.

G. Banga et al., "Better Operating System Features for Faster Network Servers," in Proceedings of Workshop on Internet Server Performance, 6 pages, Jun. 1998.

* cited by examiner

METHODS AND APPARATUS FOR ENSURING QUALITY OF SERVICE IN AN OPERATING SYSTEM

FIELD OF THE INVENTION

The present invention relates generally to computer systems, and more particularly to techniques for providing a desired quality of service (QoS) for an application running in a computer system.

BACKGROUND OF THE INVENTION

In a typical computer system, multiple applications may contend for the same physical resources, such as central processing unit (CPU), memory, and disk or network bandwidth. An important goal for an operating system in such a computer system is therefore to schedule requests from different applications so that each application and the system as a whole perform well.

The resource management techniques used in conventional time-sharing operating systems often achieve acceptably low response time and high system throughput for many different types of time-sharing workloads. Examples of conventional time-sharing operating systems include Unix, as described in, e.g., M. McKusick et al., "The Design and Implementation of the 4.4 BSD Operating System," Addison Wesley Pub. Co., Reading, Mass., 1996, and Windows NT, as described in, e.g., H. Custer, "Inside Windows NT," Microsoft Press, 1993.

However, several trends make the resource management techniques of these and other conventional time-sharing operating systems increasingly inappropriate. First, many workloads now include real-time applications, such as multimedia. Unlike time-sharing applications, real-time applications generally must have their requests processed within certain performance bounds, e.g., require a certain minimum throughput. In order to support real-time applications correctly under arbitrary system load, the operating system must perform admission control and offer QoS guarantees. In other words, the operating system should admit a request only if the operating system has set aside enough resources to process the request within the specified performance bounds.

Second, even for purely time-sharing workloads, the trend toward distributed client-server architectures increases the importance of fairness, i.e., of preventing certain clients from monopolizing system resources. The fairness of conventional time-sharing systems can often be inadequate. For example, time-sharing systems typically cannot isolate the performance of a World Wide Web (Web) site from that of other Web sites hosted on the same system. If one of the sites becomes very popular, the performance of the other sites may become unacceptably and unfairly poor.

Finally, the above-noted trend toward client-server architectures also makes it necessary to manage resources hierarchically, i.e., recursively allowing each client to grant to its servers part of the client's resources. For example, Web servers and other user-level servers often need mechanisms for processing client requests with specified QoS and/or fairness bounds. However, time-sharing operating systems usually do not provide such mechanisms.

These and other drawbacks associated with resource management techniques in conventional time-sharing operating systems have led to the recent development of a number of new techniques. For example, J. Bruno, E. Gabber, B. Özden and A. Silberschatz, "The Eclipse Operating System: Providing Quality of Service via Reservation Domains," in Proceedings of Annual Tech. Conf., USENIX, June 1998, pp. 235–246, describes Move-to-Rear List Scheduling (MTR-LS), a new CPU scheduling algorithm with demonstrated throughput, delay, and fairness guarantees. MTR-LS is an example of a so-called proportional share scheduler.

Other recently developed proportional share schedulers are described in, e.g., D. Stiliadis and A. Varma, "Frame-Based Fair Queuing: A New Traffic Scheduling Algorithm for Packet-Switched Networks," Tech. Rep. UCSC-CRL-95-39, Univ. Calif. Santa Cruz, July 1995; J. Bennet and H. Zhang, "WFQ: Worst-Case Fair Weighted Fair Queueing," in Proceedings of INFOCOM'96, IEEE, March 1996, pp. 120–128; J. Bennet and H. Zhang, "Hierarchical Packet Fair Queueing Algorithms," in Proceedings of SIGCOMM'96, ACM, August 1996; P. Goyal, X. Gao and H. Vin, "A Hierarchical CPU Scheduler for Multimedia Operating Systems," in Proceedings of OSDI'96, USENIX, October 1996, pp. 107–121; and I. Stoica, H. Abdel-Wahab, K. Jeffay, S. Baruah, J. Gehrke and C. G. Plaxton, "A Proportional Share Resource Allocation Algorithm for Real-Time, Time-Shared Systems," in Proceedings of Real Time Systems Symp., IEEE, December 1996.

A major shortcoming of the above-mentioned proportional share schedulers is that they do not prescribe satisfactory solutions to many problems that arise in their adoption in an operating system. First, it is desirable that an operating system provide a uniform application programming interface (API) for all of the system's schedulers and resources. In the case of proportional share schedulers, this should be a resource reservation API, which allows applications to reserve for exclusive use portions of each resource. However, several of the above-mentioned proportional share schedulers were proposed without an API, since they were not implemented and were evaluated only analytically or in simulations. Other proportional share schedulers were implemented, but used only an API limited to a given scheduler and resource.

Second, it is desirable that the resource reservation API be easy to integrate with the conventional API of existing operating systems and allow resource reservations to be used in conventional interfaces. For example, in Unix-derived systems, a resource reservation API that allows disk or network reservations to be used in conventional read and write calls may advantageously reduce the number of modifications necessary in existing applications for the applications to benefit from proportional share scheduling. However, simply adding resource reservations to conventional objects such as files or sockets does not provide correct sharing semantics. Those objects can be shared by different users. If a user's resource reservation is simply added to a shared object, other users may inappropriately use the first user's resource reservation. None of the above-mentioned proportional share schedulers properly define how sharing is handled.

Third, the resource reservation API should define how a parent process running on the operating system can limit the resource reservations used by its children processes. This is necessary for system protection and may be useful also when a server process spawns a child process to handle a given client's request. The above-mentioned proportional share schedulers do not propose how this would be accomplished.

Finally, a garbage collection mechanism is necessary for resource reservations. Such a mechanism automatically reclaims reserved resources when they no longer are needed. Without such mechanism, a process that terminates abnormally while holding a resource reservation would cause the reserved resource to become permanently unavailable to other processes. None of the above-mentioned proportional share schedulers propose a solution to this problem.

As is apparent from the above, many emerging applications require QoS guarantees from the operating system. Although conventional proportional share schedulers can provide QoS guarantees, the above-identified problems must be solved before such schedulers can be adopted in operating systems.

SUMMARY OF THE INVENTION

The invention provides techniques for ensuring a desired quality of service (QoS) for an application running on an operating system. An illustrative embodiment of the invention allows applications to create resource reservations using an application program interface (API) in the form of a hierarchical file system referred to herein as /reserv. The API has the advantage of applying uniformly to multiple proportional share schedulers and resources, e.g., CPU, physical memory, and disk and network bandwidth. The API represents resource reservations by directories under /reserv and includes a separate directory for each independently scheduled physical resource of the computer system. The parent of a resource reservation is either /reserv or another reservation for the same resource. Each resource reservation includes a share file that specifies the minimum amount of resources that the reservation receives from its parent and the weight with which a reservation shares its parent's resources. A resource reservation is referred to as an internal reservation if it can have children, and is referred to as a queue if it cannot have children.

The invention allows a process to associate a reference to an object with a queue. The queue may be, e.g., a disk or network queue; the reference is possibly private to the process, e.g. a file descriptor; and the object is possibly shared with other processes, e.g., a file or socket. Thus, the invention preserves the protected use of a queue even when the queue is used in requests on shared objects.

In accordance with another aspect of the invention, when a process uses the operating system's conventional API and an object reference to issue a request, the operating system internally tags the request with the identifier of the queue that is associated with that object reference. Schedulers use such queue identifier to place each request in the corresponding queue. A proportional-share scheduler apportions the respective resource to each queue in proportion to the queue's share. Advantageously, the invention allows reservations to be used even when the application uses the operating system's conventional API. Consequently, the invention minimizes the number of modifications that may be necessary in existing applications for them to be able to benefit from proportional-share scheduling.

The invention also includes a mechanism whereby a parent process may limit the resource reservations used by its children processes, and a mechanism for garbage-collecting resource reservations when they are no longer needed.

Advantageously, the invention allows selected applications to isolate their performance and the performance of their corresponding client(s) from CPU, memory, disk, or network interface overloads caused by other applications. Such a capability is becoming increasingly important for real-time, multimedia, Web, and distributed client-server applications.

DETAILED DESCRIPTION OF THE INVENTION

The present invention will be illustrated below in conjunction with exemplary techniques for guaranteeing quality of service (QoS) for applications in an operating system. It should be understood, however, that the invention is not limited to use with any particular type of computer system or computer system configuration, but is instead more generally applicable to any type or configuration of computer system in which it is desirable to provide improved QoS performance without unduly increasing system complexity. For example, although illustrated below in the context of operating systems derived from 4.4 BSD Unix (FreeBSD and Eclipse/BSD), the techniques of the invention can also be applied to other operating systems, including other Unix-derived operating systems and Windows NT.

The invention provides techniques for integrating proportional share schedulers into conventional operating systems so as to enable those systems to provide QoS guarantees. An illustrative embodiment of the invention provides a uniform application programming interface (API) for hierarchical proportional resource sharing, referred to herein as the /reserv file system, and integrates the API with various proportional share schedulers for different resources on the above-noted FreeBSD operating system. Advantageously, the uniform API of the present invention promotes uniformity not only across different schedulers, but also across different resources. The resulting modified operating system of the present invention is referred to herein as "Eclipse/BSD."

The Eclipse/BSD hierarchical resource management model, and its implementation in the FreeBSD operating system, will now be described in detail. Eclipse/BSD applications obtain a desired QoS by initially acquiring a resource reservation for each required physical resource. Physical resources include CPU, memory, disks, and network interfaces, each managed by a scheduler. A resource reservation specifies a fraction of the resource set aside for exclusive use by one or more processes. Applications can subdivide resource reservations hierarchically. Admission control guarantees that reservations do not exceed resources. As will be described in greater detail below, Eclipse/BSD's schedulers share fractions of the respective resource fairly among all applications currently using the resource.

Figure 1:
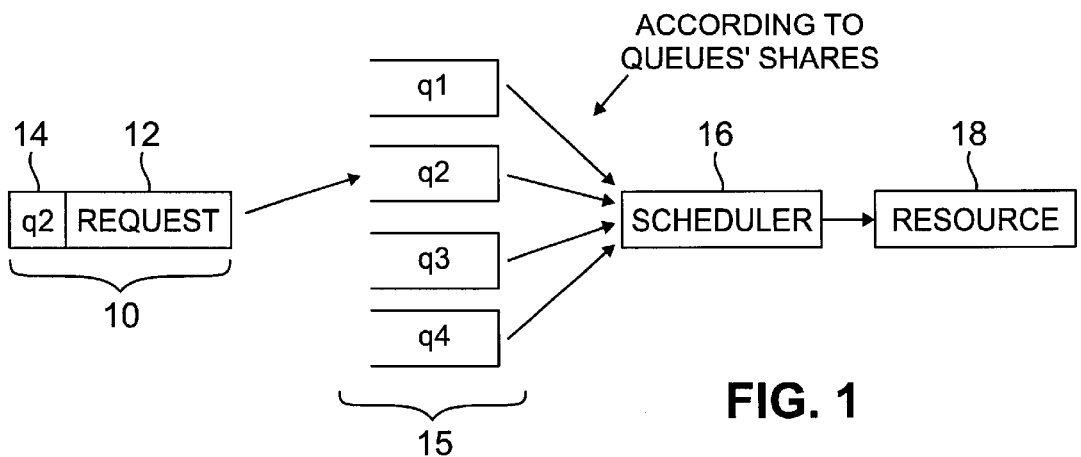
FIG. 1 illustrates the manner in which requests are tagged with a queue identifier and a proportional-share scheduler apportions resources to the requests in each queue in proportion to the queue's share, in accordance with the invention.

FIG. 1 illustrates request processing in the illustrative embodiment of the invention. In, accordance with the invention, every request arriving at a given one of the above-noted schedulers must specify a queue, and the given scheduler apportions resources to each queue based on the queue's share of that resource. In the FIG. 1 example, a particular request 10 includes the request information 12 along with an identifier 14 of the particular queue to which the request will be directed. A set of queues 15 includes four queues, q1, q2, q3 and q4 as shown. A scheduler 16 submits the requests from the queues 15 to a resource 18 according to the queues' shares of that resource.

Figure 2:
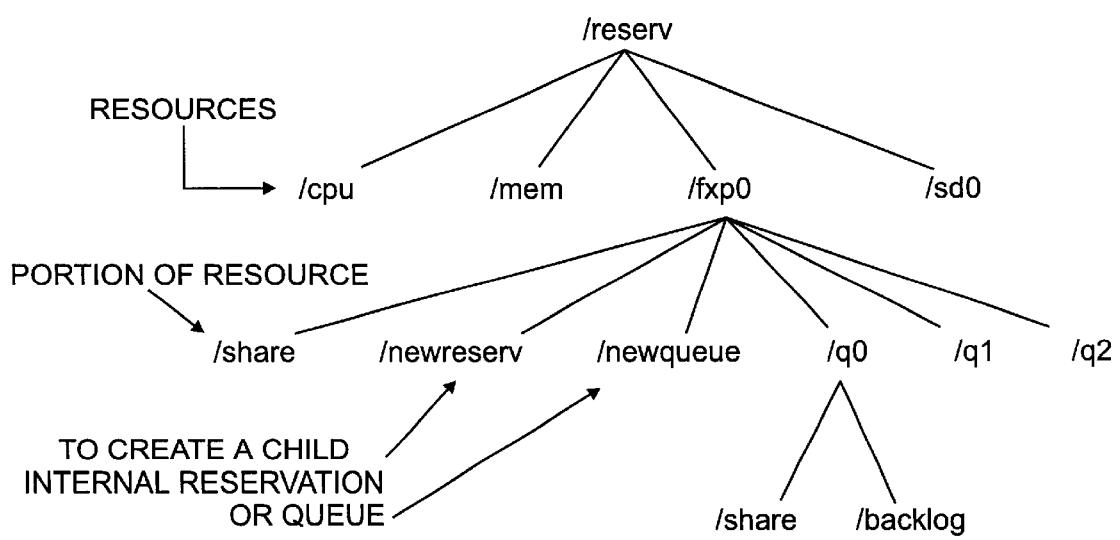
FIG. 2 shows an example of a file system that allows applications to create hierarchical resource reservations in accordance with the invention.

In accordance with the invention, applications specify resource reservations as directories in a file system referred to as /reserv. FIG. 2 illustrates an example of the /reserv file system. Each independently scheduled resource in the corresponding computer system corresponds to a directory under /reserv, e.g., /reserv/cpu (CPU), /reserv/mem (physical memory), /reserv/fxp0 (network interface 0), /reserv/sd0 (disk 0), etc., as shown in FIG. 2. Devices with multiple independently-scheduled resources generally correspond to multiple directories, whereas multiple jointly-scheduled resources, e.g., mirrored disks, correspond to a single directory.

A given resource reservation r is called an internal reservation if it can have children, or a queue if it cannot have children. The parent p of a given resource reservation r is always either /reserv or another reservation for the same resource. Each resource reservation r in the illustrative embodiment contains a share file that specifies two values: $m_r$, the minimum absolute value of the resources that r obtains from p, and $\phi_r$, the weight with which r shares p's resources. The value $m_r$ is specified in units appropriate to the respective resource, e.g., SPECint95 for CPU, bytes for physical memory, or Kbps for disk or network interfaces. If p is /reserv, $m_r=V$, the entirety of the resource, and $\phi_r$ is 100%. The amount of resources apportioned to a reservation r, $v_r$, depends dynamically on what reservations are actually being used. Every request arriving at a scheduler must specify a queue for processing that request; the request is said to use that queue. Schedulers enqueue and service in first-in, first-out (FIFO) order requests that use the same queue. A reservation r is said to be "busy" while there is at least one request that uses r or a descendent of r.

If a resource reservation r is internal, then it also contains the files newreserv and newqueue. By opening either of these files, an application creates an internal reservation or queue, respectively, that is r's child. The open call returns the file descriptor of the newly created share file, initialized with $m_r=0$ and $\phi_r=0$. Internal reservations thus created are consecutively numbered r0, r1, and so on, whereas queues are numbered q0, q1, and so on.

If resource reservation r is a queue, then it also contains the file backlog. Writing into backlog clears the number of requests served and amount of service provided and sets the maximum number of requests and amount of service that may concurrently be waiting in the queue.

Reading from backlog returns the number of requests served and the amount of service provided, in units appropriate to the respective resource, e.g. CPU time or bytes.

Eclipse/BSD prevents reservations from exceeding resources in the following manner. Let $S_p$ be the set of p's children and $$M_{s_p} = \Sigma_{i \in s_p} m_i.$$

Then writing into the share file of $r \in S_p$ is subject to the following admission control rule: the call fails if p is /reserv (i.e., the entirety of the resource has a fixed value), $$M_p < M_{s_p}$$

(i.e., a parent's minimum resources must at least equal the sum of its children's minima after the attempted write), or $\phi_r < 0$ (i.e., weights must be nonnegative).

Eclipse/BSD shares resources fairly according to the weights of the busy reservations. If reservation r is not busy, then its apportionment is $v_r=0$. Otherwise, let p be the parent of r, $B_p$ be the set of p's busy children, and $$\Phi_{B_p} = \Sigma_{i \in B_p} \phi i.$$

If p is /reserv, then $v_r=V$, where V is the entirety of the resource, otherwise:

$$v_r = \frac{\phi_r}{\Phi_{B_p}} v_p.$$

The resource reservations each process is allowed to create or use will now be described. In Eclipse/BSD, a process P's reservation domain is a list of internal reservations, each called a root reservation, one for each resource. Queue q0 of process P's root reservation r is called P's default queue for the respective resource. A process P can list any directory under /reserv and open and read any share or backlog file, but can write on share or backlog files or open newreserv or newqueue files (i.e., create children) only in reservations that are equal to or descend from one of P's root reservations.

The reservation domain of a process pid is represented by a new read-only file, /proc/pid/rdom, added to FreeBSD's proc file system (where rdom stands for "reservation domain"). For example, /proc/103/rdom could contain:

/reserv/cpu /r2 /reserv/mem /r1

/reserv/fxpo /r0 /reserv/sdo /r3 meaning that process 103 has root CPU reservation r2, root memory reservation r1, root network reservation r0, and root disk reservation r3. If process 104 is in the same reservation domain, /proc/104/rdom would have the same contents. The reservation domain of the current process is named /proc/curproc/rdom.

The reservation domain of processes spawned by a process pid is given by the new file /proc/pid/crdom (where crdom stands for "child reservation domain"). When a child is forked, its rdom and crdom files are initialized to the contents of the parent's crdom file. File /proc/pid/crdom is writable by any process with the same effective user identifier as that of process pid, or by a super user. Writing into crdom files is checked for consistency and may fail, i.e., for each root reservation r in /proc/pid /rdom, /proc/pid/crdom must contain an internal reservation r that is equal to or descends from r.

As previously noted in conjunction with FIG. 1, Eclipse/BSD tags every request with the queue used for that request. Resource reservations often cannot simply be associated with shared objects because different clients' requests may specify the same object but different queues. For example, two processes may be in different reservation domains and each may need to use a different disk queue to access a shared file, or a different network output link queue to send packets over a shared socket. It would be difficult to compound reservations used on the same object correctly if reservations were associated with the object, because then one client could benefit from another client's reservations. Therefore, in accordance with the invention, Eclipse/BSD queues are associated with references to shared objects, rather than the shared objects themselves (e.g., process, memory object, virtual node (vnode), socket, etc.). This is accomplished in the illustrative embodiment by modifying otherwise conventional FreeBSD data structures as follows:

1. The CPU scheduler manages activations instead of processes. An activation points to a process and to the CPU queue in which that process should run.
2. The memory region structure points to the region's memory object and memory queue.
3. The file descriptor structure points to the file (and thereby to the vnode or socket) and to the device queue used for I/O on that file descriptor.

CPU, memory, and device queue pointers are always initialized to the process's default queue for the respective resource. Queue pointers can subsequently be modified only to descendents of the process's root reservation for the respective resource. Initialization and modification of queue pointers in the illustrative embodiment occur as follows:

1. The initial activation created when a process P is spawned has a CPU queue pointer determined in accordance with the crdom file of P's parent. P can subsequently create children of its CPU root reservation, e.g., to process each client's requests. P can switch directly from one CPU queue to another by using a new system call, activation_switch. Alternatively, P can spawn new processes that run on CPU queues according to P's crdom file.
2. The memory queue pointer of a region R is initialized when R is allocated, and can subsequently be modified using a new system call, mreserv, with region address, length, and name of the new memory queue as arguments.
3. The device queue pointer of a file descriptor $fd$ is initialized: for vnodes, at open time; for connected sockets, at connect or accept time; for unconnected sockets, at sendto or sendmsg time if $fd$'s device queue pointer has not yet been initialized. A new command to the fcntl system call, F_QUEUE_GET, returns the name of the queue to which $fd$ currently points.

The queue pointer can subsequently be modified using the new command F_QUEUE_SET to the fcntl system call, with the name of the new device queue as argument.

Additionally, I/O request data structures (including uio for all I/O, mbuf for all network output, and buf for disk input that misses in the buffer cache and for all disk output) gain a pointer to the queue they use. Eclipse/BSD copies a file descriptor's queue pointer to the I/O requests generated using that file descriptor.

The manner in which resource reservations are destroyed will now be described. The process of destroying resource reservations is referred to herein as "garbage collection." Each resource reservation has a reference count equal to the number of times the reservation appears in an rdom or crdom file or is pointed to by an activation, memory region, or file descriptor. A process's rdom and crdom files are created when the process is forked and are destroyed when the process exits. The file descriptor of a share file in the /reserv file system of FIG. 2 points to the respective resource reservation. Additionally, as described previously, file descriptors for vnodes and sockets also point to the resource reservations they use. Eclipse/BSD updates reservation reference counts on process fork and exit, activation_switch, memory region allocation and deallocation, mreserv, file open or close, socket connect or accept, sendto, sendmsg, and fcntl F_QUEUE_SET.

A flag, referred to herein as a garbage collection flag or GC flag, determines whether a resource reservation should be garbage-collected when the number of references to the reservation drops to zero. When a resource reservation is created, its GC flag is enabled, but a privileged process can disable it. New commands to the fcntl system call, F_COLLECT_SET and F_COLLECT_GET, can be used on the file descriptor of a reservation's share file to set or get the reservation's GC flag.

In accordance with the invention, a resource reservation r may be garbage collected as follows:

1. Let p be r's parent.
2. If r is a default queue or has non-zero reference count, return; else if r is a queue, remove r; else recurse this step for each child of r and, after that, if r's only child is r's default queue d and d's reference count is zero, remove d and r.
3. While p has zero reference count and p's only child is p's default queue d and d's reference count is zero, make r equal top, make p equal top's parent, and remove d and r.

Removal of a given queue q may need to be deferred. For example, if q is being used by at least one request, q generally cannot be removed immediately. Instead, q's REMOVE_WHEN_EMPTY flag is set. When the last request that uses q completes and q's REMOVE_WHEN_EMPTY flag is set, if q's reference count is still zero, the scheduler garbage-collects q. Otherwise, the scheduler resets the flag.

The above-described /reserv API provides a uniform interface to multiple proportional share schedulers. As will be described in detail below, Eclipse/BSD in the illustrative embodiment incorporates a proportional share scheduler for each resource.

Eclipse/BSD's CPU scheduler uses the Move-To-Rear List Scheduling (MTR-LS) algorithm described in the above-cited J. Bruno et al. reference. When a process blocks (e.g., waiting for I/O), MTR-LS keeps the unused portion of the process's quota in the same position in the scheduling list, unlike the Weighted Round Robin (WPR) algorithm, which removes the process from the runnable list and, when the process becomes runnable again, places it back at the tail of the list. Consequently, MTR-LS may delay I/O-bound processes much less than does WRR. MTR-LS may also provide greater throughput than does WRR, whose scheduling delays may prevent I/O-bound processes from fully utilizing their CPU reservations.

MTR-LS was specifically designed for CPU scheduling, where the time necessary to process a request cannot be predicted. As described in the above-cited J. Bruno et al. reference, MTR-LS provides an optimal cumulative service guarantee when the durations of service requests are unknown a priori. However, MTR-LS assumes that requests can be preempted either at any instant or at fixed intervals. This is true of CPU scheduling, but usually is not true of disk or network scheduling, where requests cannot be preempted after they start and may take a varying amount of time to complete. Therefore, Eclipse/BSD in the illustrative embodiment uses other proportional share scheduling algorithms for I/O scheduling.

Eclipse/BSD's I/O schedulers use approximations to the Generalized Processor Sharing (GPS) algorithm described in A. Parekh and R. Gallager, "A Generalized Processor Sharing Approach to Flow Control—The Single Node Case," Trans. Networking, ACM/IEEE, 1(3):344–357, June 1993. GPS assumes an ideal "fluid" system where each backlogged "flow" in the system instantaneously receives service in proportion to the flow's share and in inverse proportion to the sum of the shares of all backlogged flows (where a backlogged flow is analogous to a busy queue). GPS cannot be precisely implemented for I/O because typically (1) I/O servers can only service one request at a time and (2) an I/O request cannot be preempted once service on it begins. GPS approximations estimate the time necessary for servicing each request and interleave requests from different queues so that each queue receives service proportionally to its share (although not instantaneously). However, the necessary time estimates may be difficult to compute precisely because GPS's rate of service for each flow depends on what flows are backlogged at each instant, as described in J. Bennet and H. Zhang, "Hierarchical Packet Fair Queueing Algorithms," in Proceedings of SIGCOMM'96, ACM, Aug. 1996.

Eclipse/BSD's disk scheduler uses a new GPS approximation known as the YFQ (Yet another Fair Queueing) algorithm, as described in J. Bruno, J. Brustoloni, E. Gabber, B. Özden and A. Silberschatz, "Disk Scheduling with Quality of Service Guarantees," Proceedings of ICMCS'99, IEEE, June 1999. The YFQ algorithm can be implemented very efficiently. In accordance with the YFQ algorithm, a resource is called "busy" if it has at least one busy queue, or "idle" otherwise. YFQ associates a start tag $S_i$ and a finish tag $F_i$ with each queue $q_i$. $S_i$ and $F_i$ are initially zero. YFQ defines a virtual work function, v(t), such that: (1) v(0)=0; (2) While the resource is busy, v(t) is the minimum of the start tags of its busy queues at time t; and (3) When the resource becomes idle, v(t) is set to the maximum of all finish tags of the resource.

When a new request $r_i$ that uses queue $q_i$ arrives: (1) If $q_i$ was previously empty, YFQ makes $$S_i = \max(v(t), F_i)$$

followed by $$F_i = S_i + \frac{l_i}{w_i},$$

where $l_i$ is the data length of the request $r_i$; and (2) YFQ appends $r_i$ to $q_i$. YFQ selects for servicing the request $r_i$ at the head of the busy queue $q_i$ with the smallest finish tag $F_i$. The request $r_i$ remains at the head of $q_i$ while $r_i$ is being serviced. When $r_i$ completes, YFQ dequeues it; if queue $q_i$ is still non-empty, YFQ makes $S_i = F_i$ followed by $$F_i = S_i + \frac{l'_i}{w_i},$$

where $l'_i$ is the data length of the request $r'_i$ now at the head of $q_i$.

Figure 3:
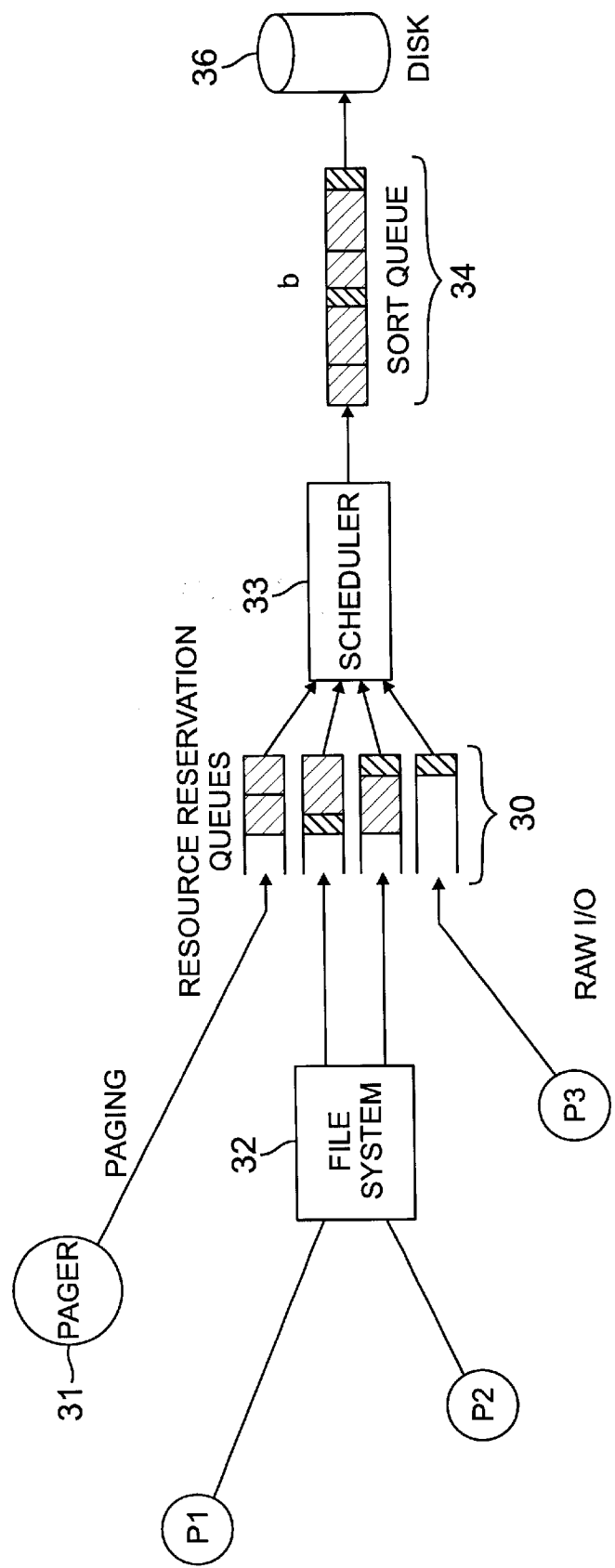
FIG. 3 illustrates the operation of Yet another Fair Queueing (YFQ), a proportional-share disk scheduling algorithm used in an illustrative embodiment of the invention.

Selecting one request at a time, as described above, allows YFQ to approximate GPS quite well, providing good cumulative service, delay, and fairness guarantees. However, such guarantees may come at the cost of excessive disk latency and seek overheads, harming aggregate disk throughput. Therefore, YFQ can be configured to select up to a batch of b requests at a time and place them in a sort queue, as illustrated in FIG. 3. A set of queues 30 receive requests from a number of processes, including a pager 31, processes P1 and P2 via a file system 32, and raw I/O from a process P3. A scheduler 33 selects the above-noted batch b of requests and places them in a sort queue 34. The disk driver or the disk itself 36 may reorder requests in the sort queue 34 so as to minimize disk latency and seek overheads.

Eclipse/BSD's network output link scheduler uses the hierarchical Worst-case Fair Weighted Fair Queueing (WF$^2$Q) algorithm described in J. Bennet and H. Zhang. "Hierarchical Packet Fair Queueing Algorithms," Proceedings of SIGCOMM'96, ACM, August 1996. This algorithm is similar to an earlier GPS approximation known as Weighted Fair Queueing (WFQ) and described in A. Demers, S. Keshav and S. Shenker, "Design and Analysis of a Fair Queueing Algorithm," Proceedings of SIGCOMM'89, ACM, September 1989, pp. 1–12. However, unlike WFQ, WF$^2$Q does not schedule a packet until it is eligible, i.e., until after its transmission would have started under GPS. Consequently, WF$^2$Q has optimal worst case fair index bound, making it a good choice for a hierarchical scheduler.

It should be noted that neither YFQ nor WF$^2$Q could be used for CPU scheduling, since they assume that the time necessary to process a request can be estimated and they never preempt a request.

For network input processing, Eclipse/BSD utilizes Signaled Receiver Processing (SRP), as described in the U.S. Patent Application of J. Brustoloni et al. entitled "Signaled Receiver Processing Methods and Apparatus for Use in Operating Systems" and filed concurrently herewith. SRP demultiplexes incoming packets before network and higher-level protocol processing. Unlike FreeBSD's single IP input queue and input protocol processing at the software interrupt level, SRP uses an unprocessed input queue (UIQ) per socket and processes input protocols in the context of the respective applications. If a socket's queue is full, SRP drops new packets for that socket immediately, unlike FreeBSD, which wastefully processes packets that will eventually need to be dropped. Because SRP processes protocols in the context of the respective receiving applications, SRP can avoid the problem of receive livelock. As described in J. Mogul and K. K. Ramakrishnan, "Eliminating Receive Livelock in an Interrupt Driven Kernel," Proceedings of Annual Tech. Conf., USENIX, 1996, pp. 99–111, receive livelock is a network input overload condition that prevents any packets from being processed by an application. When SRP enqueues a packet into a socket's UIQ, SRP signals SIGUIQ to the applications that own that socket. The default action for SIGUIQ is to perform input protocol processing (asynchronously to the applications). However, applications can synchronize such processing by catching, blocking, or ignoring SIGUIQ and deferring protocol processing until a later input call (e.g., recv). Synchronous protocol processing may improve cache locality. Unlike Lazy Receive Processing (LRP), described in P. Druschel and G. Banga, "Lazy Receiver Processing (LRP): A Network Subsystem Architecture for Server Systems," Proceedings of OSDI'96, USENIX, October 1996, pp. 261–275, SRP does not use separate kernel threads for asynchronous protocol processing, and therefore can be easily ported to systems that do not support kernel threads, such as FreeBSD.

The above-described illustrative embodiment of Eclipse/BSD can be implemented with only relatively minor modification to the underlying FreeBSD operating system. For example, it is possible to implement Eclipse/BSD by adding approximately 6500 lines of code to FreeBSD version 2.2.8: 2400 lines for the /reserv file system and modifications to the proc file system, and 4100 lines for the new schedulers and their integration into the kernel. The kernel size in the GENERIC configuration is 1601351 bytes for FreeBSD and 1639297 bytes for Eclipse/BSD, i.e., an increase of only 38 KB.

Figure 4:
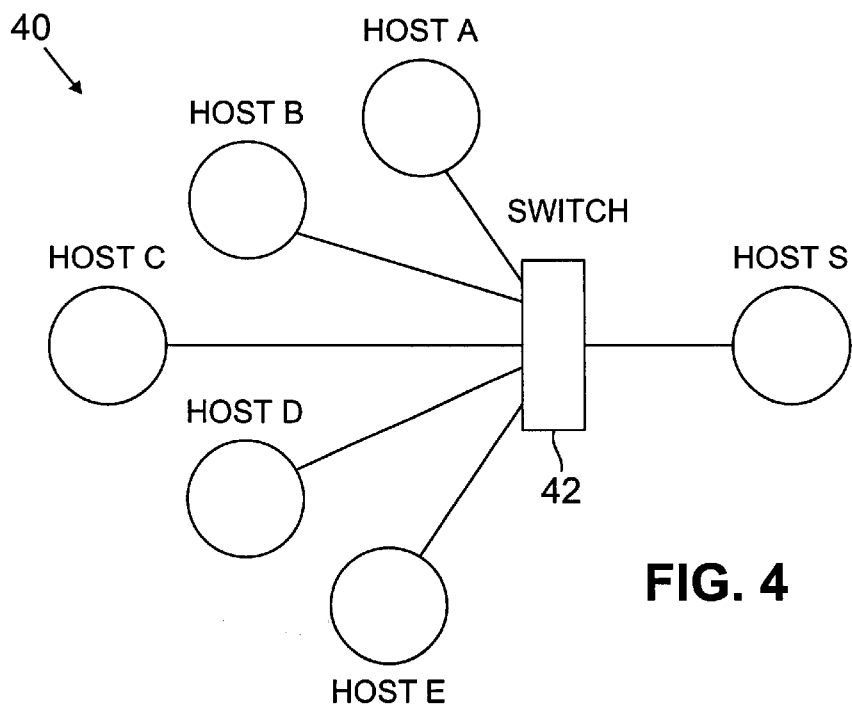
FIG. 4 shows an example of a computer network in which the invention may be used.

FIG. 4 shows an exemplary computer network 40 in which the invention may be used. The network 40 includes hosts A, B, C, D, E and S, each connected to a switch 42 as shown. Each of the hosts A, B, C, D, E may represent one or more client computers, and the host S may represent one or more server computers. The switch 42 may represent a local area network, a metropolitan area network, a wide area network, a global data communications network such as the Internet, a private "intranet" or "extranet" network, as well as portions or combinations of these and other data communication media.

Figure 5:
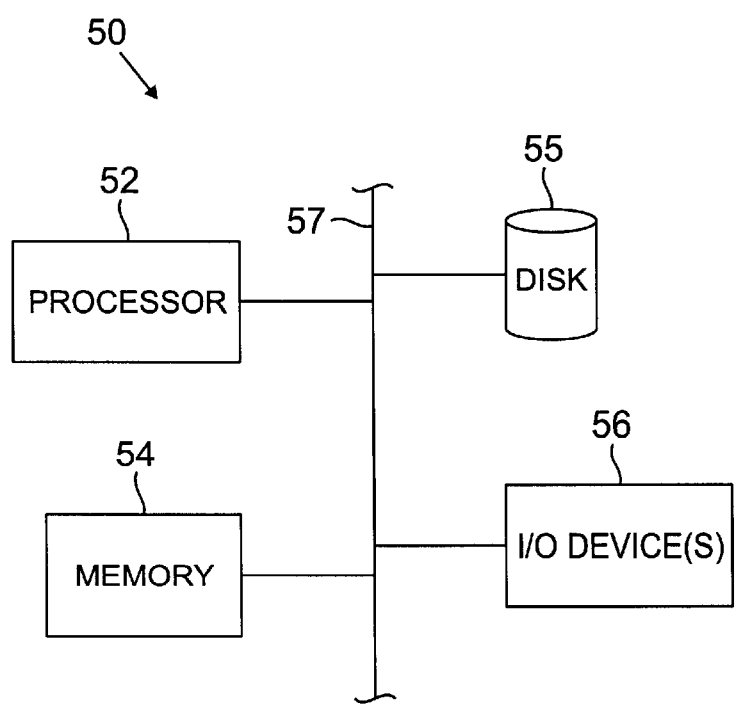
FIG. 5 shows a more detailed view of a given one of the hosts in the network of FIG. 4.

FIG. 5 shows a more detailed view of a computer 50 which may correspond to a given one of the hosts in the network of FIG. 4. The computer 50 includes a processor 52, a memory 54, a disk-based storage device 55, and one or more input/output (I/O) devices 56, and may represent, e.g., a desktop or portable personal computer, a palmtop computer, a personal digital assistant (PDA), a micro or mainframe computer, a workstation, etc. The above-noted elements of the computer 50 communicate over a communication medium 57 which may be implemented as, e.g., a bus, a network, a set of interconnections, as well as portions or combinations of these and other media. The processor 52 may be implemented as a CPU, a microprocessor, an application-specific integrated circuit (ASIC) or other digital data processor, as well as various portions or combinations thereof. The memory 54 is typically an electronic memory, such as a random access memory (RAM) associated with the processor 52. The disk-based storage device 55 may be an external magnetic or optical disk memory, a magnetic tape memory, or other suitable data storage device.

FIGS. 6–11 show experimental results that demonstrate that applications can use Eclipse/BSD's /reserv API and CPU, disk, and network schedulers to obtain minimum performance guarantees, regardless of other loads on the system. The experiments were performed on a network configured as shown in FIG. 4, in which it is assumed that HTTP clients on hosts A to E make requests to an HTTP server on node S. Hosts A to C were configured as Pentium Pro personal computers (PCs) running the FreeBSD operating system. Hosts D and E were configured as Sun workstations running the Solaris operating system.

In the experiments, the operating system was varied only in host S, being either FreeBSD or Eclipse/BSD. Host S was configured as a PC with 266 MHz Pentium Pro CPU, 64 MB RAM, and 9 GB Seagate ST39173W fast wide SCSI disk. All hosts were connected by a Lucent P550 Cajun Ethernet switch, which unless otherwise noted, was configured to run at 10 Mbps. Host S was configured to run the Apache 1.3.3 HTTP server, and to host multiple Web sites, while hosts A to E run client applications that make requests to the server. At most ten clients run at each of the hosts A to E. Unless otherwise noted, all measurements are the averages of three runs. Each experiment overloaded one of the server's resources, as will be described in detail below.

In a CPU scheduling experiment, an increasing number of clients continuously made common gateway interface (CGI) requests to either of two Web sites hosted at node S. Processing of each of these CGI requests consists of computing half a million random numbers (using rand0) and returning a 1 KB reply. Therefore, the bottleneck resource is the CPU. The average throughput and response time was measured (over three minutes) under the following scenarios: (1) The site of interest reserves 50% of the CPU and the competing site reserves 49% of the CPU; (2) The site of interest reserves 99% of the CPU; and (3) Both sites run in the same CPU reservation and reserve 99% of the CPU.

Figure 6:
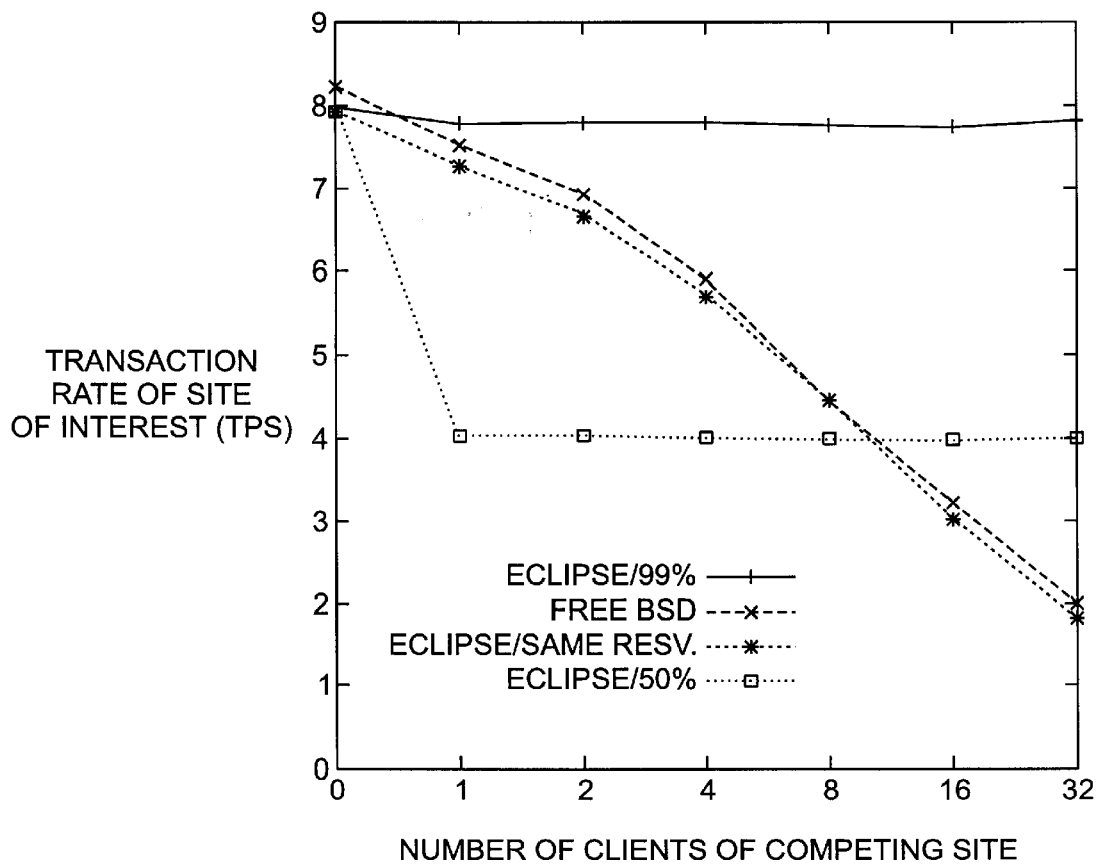
FIGS. 6 through 11 are plots illustrating the performance advantages provided by an illustrative embodiment of the invention.
Figure 7:
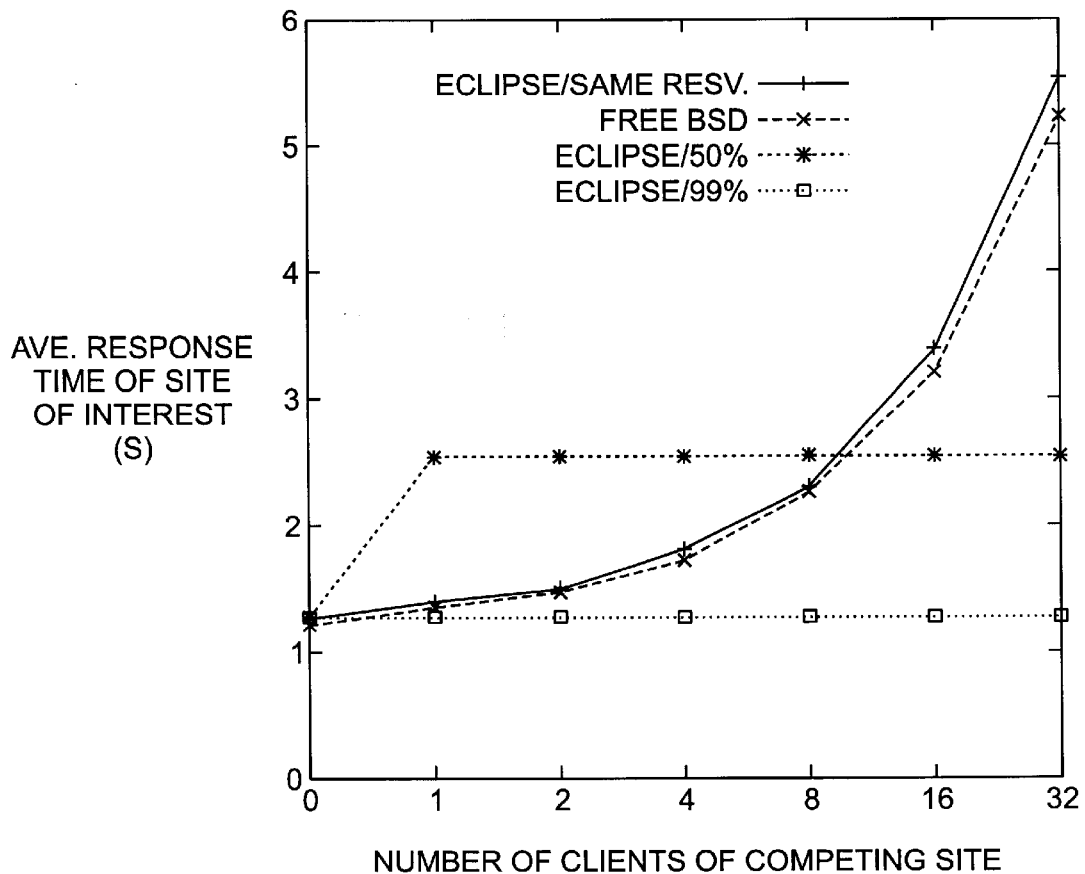

FIG. 6 shows the throughput of the site of interest when the latter has ten clients and the competing site has a varying number of clients, and FIG. 7 shows the corresponding response times. Performance when both sites run in the same CPU reservation on Eclipse/BSD is roughly the same as performance on FreeBSD. When the site of interest reserves 99% of the CPU, its performance is essentially unaffected by the other load. When the site of interest reserves 50% of the CPU, it still gets essentially all of the CPU if there is no other load, but, as would be expected, the throughput goes down by half and the response time doubles when there is other load. However, throughput and response time of the site of interest remain constant when further load is added, while on FreeBSD throughput decreases and response time increases without bound. This shows that FreeBSD and Eclipse/BSD are equally good if there is excess CPU capacity, but Eclipse/BSD can also guarantee a certain minimum CPU allocation, and consequently minimum throughput and maximum response time.

In a disk scheduling experiment, an increasing number of clients again continuously made CGI requests to either of two Web sites hosted at node S. However, these requests are I/O-intensive, consisting of reading a 100 MB file and returning a 10 KB reply. Because requests and replies are small and each request involves considerable disk I/O but little processing, the bottleneck resource in this experiment is the disk. 50% of S's disk bandwidth was reserved to the Web site of interest and the latter's average throughput was measured over three minutes. YFQ's sort queue was configured with a batch size of 4 requests. During the measurements, the site of interest had ten clients and the competing site had a varying number of clients.

Figure 8:
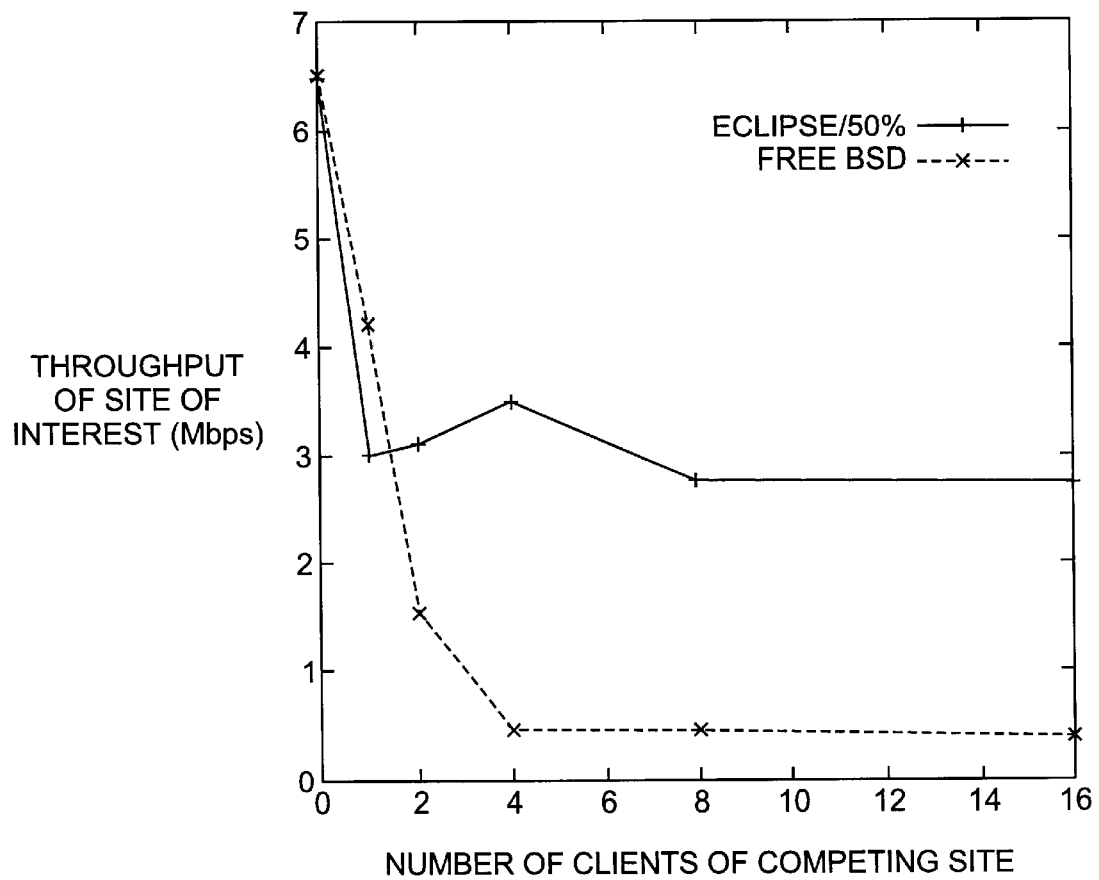

FIG. 8 shows that in the absence of other load, Eclipse/BSD gives to the site of interest essentially all of the bottleneck resource, even though the site has only 50% of the resource reserved. When the load on the competing site increases, the throughput of the site of interest decreases. However, on Eclipse/BSD, the throughput bottoms out at roughly the reserved amount, whereas on FreeBSD the throughput de creases without bound. This shows that FreeBSD and Eclipse/BSD are equally good when there is excess disk bandwidth, but when disk bandwidth is scarce, Eclipse/BSD is also able to guarantee a minimum disk bandwidth allocation.

In an output link scheduling experiment, an increasing number of clients continuously requested the same 1.5 MB document from either of two Web sites hosted at node S. Given that requests are much smaller than replies, little processing is required per request, and the requested document fits easily in the node S's buffer cache, the bottleneck resource in this experiment is S's network output link. 50% of S's output link bandwidth was reserved to the Web site of interest and the latter's average throughput was measured over three minutes. During the measurements, the site of interest had ten clients and the competing site had a varying number of clients.

Figure 9:
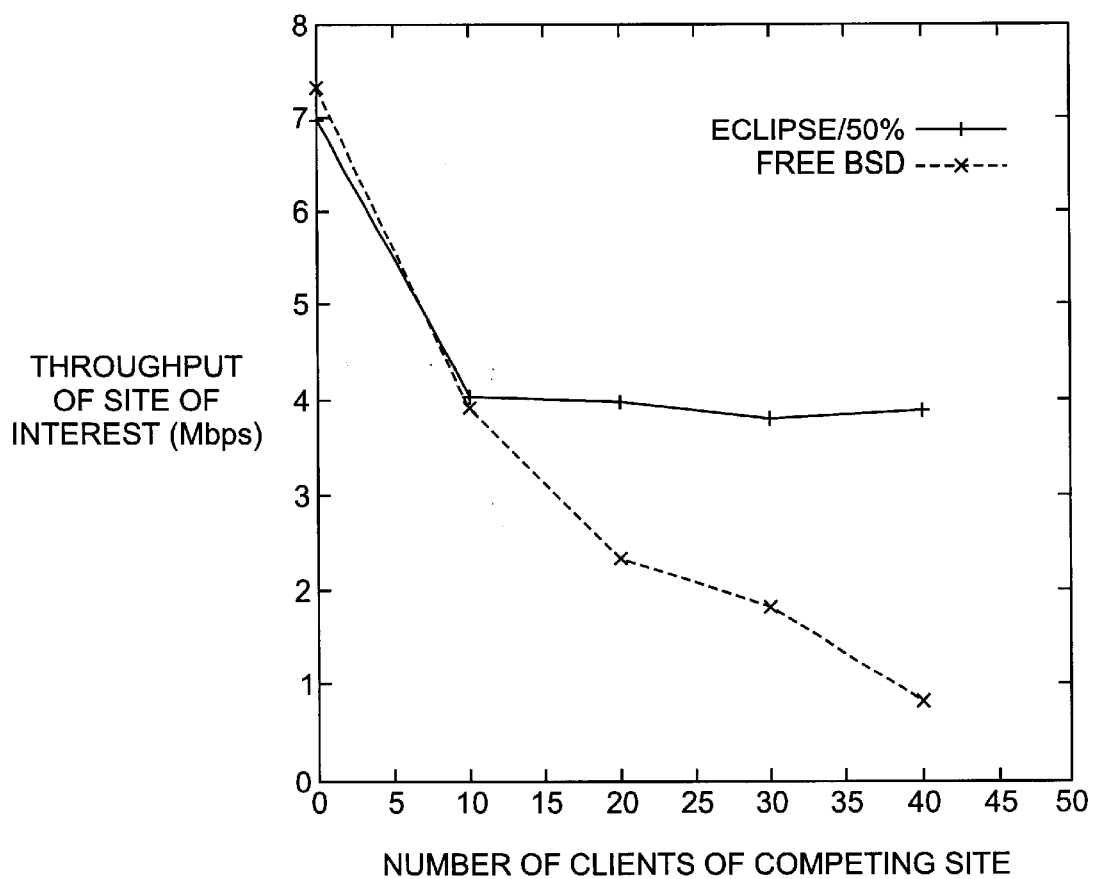

FIG. 9 shows the results, which are very similar to those of FIG. 8, where the disk is the bottleneck. FreeBSD and Eclipse/BSD are equally good when there is excess output link bandwidth, but when output link bandwidth is scarce, Eclipse/BSD is also able to guarantee a minimum output link bandwidth allocation.

Figure 10:
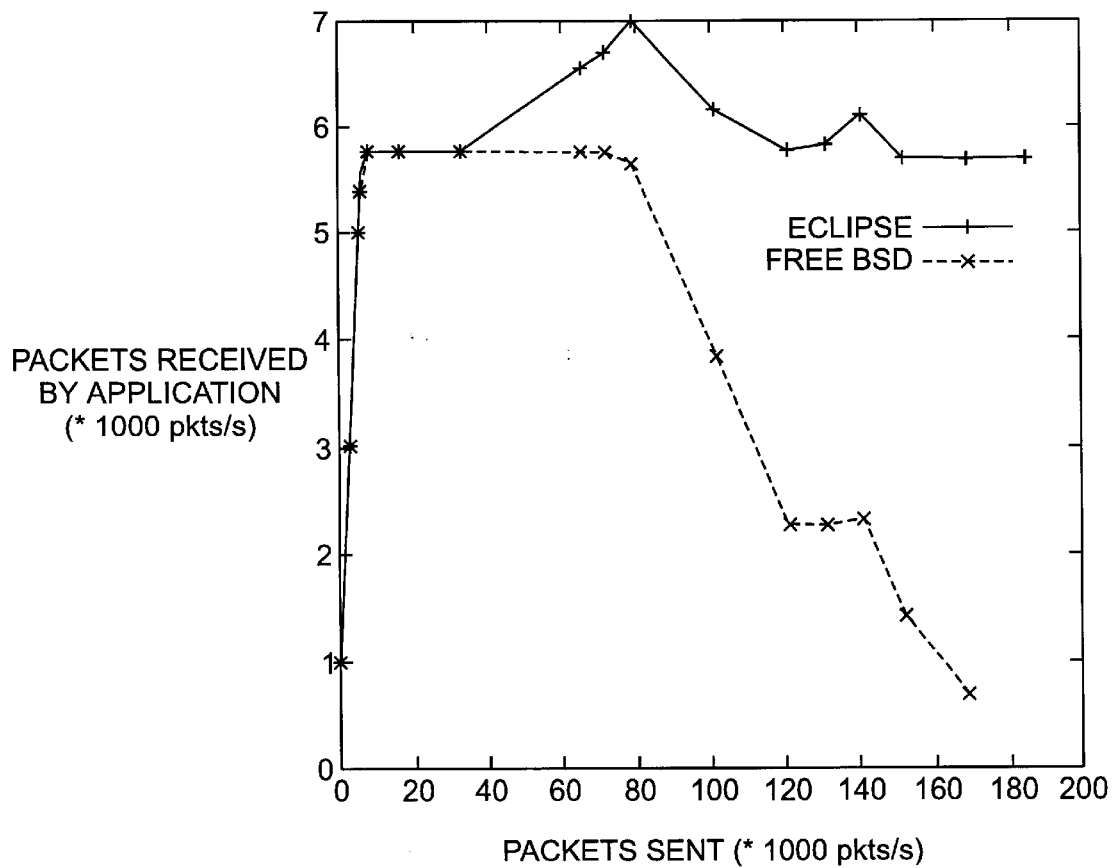

A final set of experiments addressed input link scheduling in the presence of network reception overload. In these experiments, the network switch was configured to operate at 100 Mbps full-duplex, and measurements are the averages of five runs. In a first one of these experiments, a client application sent 10-byte UDP packets at a fixed rate to a server application running at node S. Both on FreeBSD and on Eclipse/BSD, the server application received essentially all of the packets when the transmission rate was up to about 5600 packets per second (pkts/s). Above that transmission rate, as shown in FIG. 10, the reception rate on Eclipse/BSD reached a plateau at around 5700 pkts/s. However, the reception rate on FreeBSD dropped precipitously. This experiment shows that on Eclipse/BSD applications can make forward progress even when there is network reception overload, while on FreeBSD applications can enter receive livelock in such situations. As previously described, Eclipse/BSD prevents receive livelock through its use of SRP.

Figure 11:
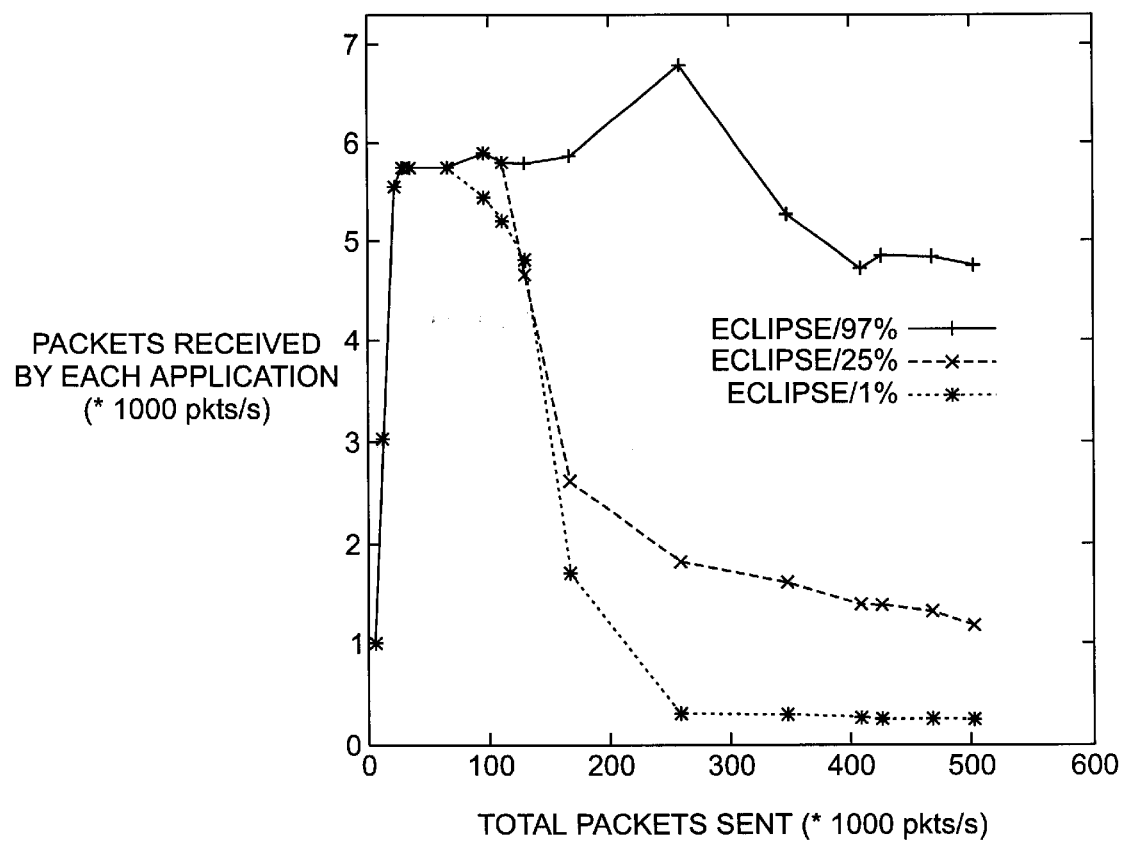

It should be noted that SRP generally cannot by itself guarantee that applications will make forward progress according to their importance. However, Eclipse/BSD can guarantee that by combining SRP and CPU reservations. In the second and final link scheduling experiment, four different client applications sent 10-byte UDP packets at the same fixed rate to a different server application running on node S. Reception rates were measured in two scenarios: (1) All four server applications each reserved 25% of the CPU; and (2) One server application reserved 97% of the CPU and the remaining server applications reserved 1% each. While the transmission rate was below 5600 pkts/s, essentially all packets were received. Reception rates increased slightly to 5900 pkts/s for a transmission rate of 28.5 Kpkts/s. Above that rate, results differ for the two scenarios, as shown in FIG. 11. In the first scenario, reception rate goes down to about 1200 pkts/s. In the second scenario, the reception rate of the application with 97% of the CPU goes down to about 4800 pkts/s, while the reception rate of the applications with 1% of the CPU goes down to about 160 pkts/s.

In the above-described illustrative embodiment of the invention, Eclipse/BSD applications can obtain resource reservations and thereby guarantee a desired QoS for themselves or for their clients. Eclipse/BSD's API, /reserv, provides a simple, uniform interface to hierarchical proportional sharing of system resources. A number of different schedulers can be used in Eclipse/BSD, and it has been demonstrated experimentally that such schedulers can isolate the performance of selected applications from CPU, disk, or network overloads caused by other applications. Eclipse/BSD can be implemented in a straightforward manner by making suitable modifications to an otherwise conventional time-sharing operating system, e.g., the FreeBSD operating system. Advantageously, the techniques of the invention can greatly improve an operating system's ability to provide QoS guarantees, fairness, and hierarchical resource management.

It should be emphasized that the exemplary techniques described herein are intended to illustrate the operation of the invention, and therefore should not be construed as limiting the invention to any particular embodiment or group of embodiments. For example, although illustrated herein using the FreeBSD operating system, the techniques of the invention can be used to provide similar improvements in other operating systems. These and numerous other alternative embodiments within the scope of the following claims will therefore be apparent to those skilled in the art.

What is claimed is:

1. A method of ensuring a particular quality of service for an application in a computer system, the method comprising the steps of:

utilizing a resource reservation application programming interface of an operating system to establish one or more quality of service guarantees that correspond to a reference to an object; and providing a particular quality of service to a request in accordance with the one or more quality of service guarantees that correspond to one or more object references used in the request;

wherein the resource reservation application programming interface defines a manner in which a parent process running on the operating system is permitted to limit resource reservations used by one or more of its children processes;

wherein the quality of service guarantees comprise resource reservations each specifying a portion of a resource set aside for exclusive use by one or more processes;

wherein the resource reservations are organized hierarchically such that each resource reservation r may have at most one parent and one or more siblings and children and associated with r is a weight that specifies how r shares the resources of r's parent with r's siblings;

wherein a given one of the resource reservations corresponds to an internal reservation if it is permitted to have children associated therewith in the hierarchy;

wherein the resource reservation corresponds to a queue if it is not permitted to have children associated therewith in the hierarchy; and wherein the operating system internally tags each request with a reference to a queue that corresponds to an object reference used in the request.

2. The method of claim 1 wherein the resource includes at least one of a processor resource, a memory resource, a disk resource, and a network interface resource.

3. The method of claim 1 wherein the object includes at least one of a process, a memory object, a file and a socket.

4. The method of claim 1 wherein the request includes at least one of a process run request, a memory pagein or pageout request, and a data input or data output request.

5. The method of claim 1 wherein the operating system comprises a Unix-derived operating system.

6. The method of claim 1 wherein the operating system comprises an operating system not derived from Unix.

7. The method of claim 1 wherein each resource reservation r receives resources from its parent in proportion to r's weight.

8. The method of claim 1 wherein associated with a resource is a proportional share scheduler that (1) places each request in a queue referenced by the request's tag, and (2) apportions the resource to requests from each queue proportionally to each queue's weight.

9. The method of claim 1 wherein the application programming interface of the operating system represents a resource reservation as a directory in a hierarchical file system.

10. The method of claim 1 wherein associated with each quality of service guarantee is a count of the number of references to the quality of service guarantee from an application or request.

11. The method of claim 10 wherein the operating system automatically destroys a quality of service guarantee when the reference count associated therewith reaches zero.

12. The method of claim 1 further including a garbage collection mechanism for reclaiming resource reservations that are no longer needed by the application.

13. A method of ensuring a particular quality of service for an application in a computer system, the method comprising the steps of:

utilizing an application programming interface of an operating system to establish one or more quality of service guarantees that correspond to a reference to an object; and providing a particular quality of service to a request in accordance with the one or more quality of service guarantees that correspond to one or more object references used in the request;

wherein the quality of service guarantees comprise resource reservations, each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings; and wherein associated with each resource reservation r is a minimum amount of resources that r receives from its parent p, such that the minimum amount of resources associated with p is at least equal to the sum of the minimum amount of resources associated with each of p's children.

14. A method of ensuring a particular quality of service for an application in a computer system, the comprising the steps of:

utilizing an application programming interface of an operating system to establish one or more quality of service guarantees that correspond to a reference to an object; and providing a particular quality of service to a request in accordance with the one or more quality of service guarantees that correspond to one or more object reference used in the request;

wherein the quality of service guarantees comprise resource reservations, each specifying a portion of a resource set aside for exclusive use by one or more processes;

wherein the resource reservations are organized hierarchically such that each resource reservation r may have at most one parent and or more siblings and children, and associated with r is a weight that specifies how r shares the resources of r's parent with r's siblings;

wherein the application programming interface of the operating system represents a resource reservation as a directory in a hierarchical file system; and wherein the directory contains one or more files specifying the minimum amount of resource and the weight of the represented resource reservation.

15. A method of ensuring a particular quality of service for an application in a computer system, the method comprising the steps of:

utilizing an application programming interface of an operating system to establish one or more quality of service guarantees that correspond to a reference to an object; and providing a particular quality of service to a request in accordance with the one or more quality of service guarantees that correspond to one or more object reference used in the request;

wherein the quality of service guarantees comprise resource reservations, each specifying a portion of a resource set aside for exclusive use by one or more processes;

wherein the resource reservations are organized hierarchically such that each resource reservation r may have at most one parent and one or more sibling and children, and associated with r is a weight that specifies how r shares the resource of r's parent with r's sibling;

wherein the application programming interface of the operating system represents a resource reservation as a directory in a hierarchical file system; and wherein if the directory represents an internal reservation r, it contains a first file that when activated creates a subdirectory that represents an additional internal reservation that is a child of r, and second file that when activated creates an additional queue that is a child of r.

16. A method of ensuring a particular quality of service for an application in a computer system, the method comprising the steps of:

utilizing an application programming interface of an operating system to establish one or more quality of service guarantees that correspond to a reference to an object; and providing a particular quality of service to a request in accordance with the one or more quality of service guarantees that correspond to one or more object references used in the request;

wherein the quality of service guarantees comprise resource reservations, each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings;

wherein the application programming interface of the operating system represents a resource reservation as a directory in a hierarchical file system; and wherein if the directory represents a queue, it contains a first file that when written to clears the number of requests served and amount of service provided and sets a maximum number of requests and amount of service that may be concurrently waiting in the queue, and which when read from returns the number of requests served and the amount of service provided.

17. A method of ensuring a particular quality of service for an application in a computer system, the method comprising the steps of:

utilizing an application programming interface of an operating system to establish one or more quality of service guarantees that correspond to a reference to an object; and providing a particular quality of service to a request in accordance with the one or more quality of service guarantees that correspond to one or more object references used in the request;

wherein the quality of service guarantees comprise resource reservations, each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings; and wherein associated with each process is one root reservation for each resource, such that the process can create, destroy, or modify only resource reservations that descend from the process's root reservations.

18. The method of claim 17 wherein a process P can specify the root reservations of processes spawned by P, said root reservations being internal reservations that are equal to or descend from P's root reservations.

19. The method of claim 18 wherein the application programming interface of the operating system represents by a first file the root reservations of a process P, and by a second file the root reservations of processes spawned by P.

20. An apparatus for ensuring a particular quality of service level for an application in a computer system, the apparatus comprising:

a processor operative to support an operating system of the computer system, the operating system including a resource reservation application programming interface utilized to establish one or more quality of service guarantees that correspond to a reference to an object, and being further operative to provide a particular quality of service to a request in accordance with the one or more quality of service guarantees that correspond to one or more object references used in the request; and a memory coupled to the processor and operative to store at least a subset of the quality of service guarantees;

wherein the resource reservation application programming interface defines a manner in which a parent process running on the operating system is permitted to limit resource reservations used by one or more of its children processes;

wherein the quality of service guarantees comprise resource reservations each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings;

wherein a given one of the resource reservations corresponds to an internal reservation if it is permitted to have children associated therewith in the hierarchy; wherein the resource reservation corresponds to a queue if it is not permitted to have children associated therewith in the hierarchy; and wherein the operating system internally tags each request with a reference to a queue that corresponds to an object reference used in the request.

21. An article of manufacture comprising a machine-readable medium for storing one or more programs for ensuring a particular quality of service level for an application in a computer system, wherein the one or more programs when executed perform the steps of:

implementing a resource reservation application programming interface of an operating system used for establishing one or more quality of service guarantees that correspond to a reference to an object; and providing a particular quality of service to a request in accordance with the one or more quality of service guarantees that correspond to one or more object references used in the request;

wherein the resource reservation application programming interface defines a manner in which a parent process running on the operating system is permitted to limit resource reservations used by one or more of its children processes;

wherein the quality of service guarantees comprise resource reservations, each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings;

wherein a given one of the resource reservations corresponds to an internal reservation if it is permitted to have children associated therewith in the hierarchy;

wherein the resource reservation corresponds to a queue if it is not permitted to have children associated therewith in the hierarchy; and wherein the operating system internally tags each request with a reference to a queue that corresponds to an object reference used in the request.

22. An apparatus for use in a computer system, the apparatus comprising:

a resource reservation application programming interface associated with an operating system of the computer system and operative to generate an association between a resource reservation of an application and a reference to a corresponding shared resource of the computer system, wherein the association is utilized to provide a particular quality of service level for the application, and wherein the resource reservation application programming interface defines a manner in which a parent process running on the operating system is permitted to limit resource reservations used by one or more of its children processes;

wherein the quality of service guarantees comprise resource reservations, each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings;

wherein a given one of the resource reservations corresponds to an internal reservation if it is permitted to have children associated therewith in the hierarchy;

wherein the resource reservation corresponds to a queue if it is not permitted to have children associated therewith in the hierarchy; and wherein the operating system internally tags each request with a reference to a queue that corresponds to an object reference used in the request.

23. A method of ensuring a particular quality of service for an application in a computer system, the method comprising the steps of:

generating, in a resource reservation application programming interface of an operating system of the computer system, an association between a resource reservation and a reference to a corresponding shared resource; and utilizing the association to provide the particular quality of service for the application;

wherein the resource reservation application programming interface defines a manner in which a parent process running on the operating system is permitted to limit resource reservations used by one or more of its children processes;

wherein the quality of service guarantees comprise resource reservations, each specifying a portion of a resource set aside for exclusive use by one or more processes;

wherein the resource reservations are organized hierarchically such that each resource reservation r may have at most one parent and one or more siblings and children, and associated with r is a weight that specifies how r shares the resources of r's parent with r's siblings;

wherein a given one of the resource reservations corresponds to an internal reservation if it is permitted to have children associated therewith in the hierarchy;

wherein the resource reservation corresponds to a queue if it is not permitted to have children associated therewith in the hierarchy; and wherein the operating system internally tags each request with a reference to a queue that corresponds to an object reference used in the request.

* * * * *